United States Patent [19]

Toraason et al.

[11] Patent Number: 5,176,174
[45] Date of Patent: Jan. 5, 1993

[54] FLOW METERING AND DISTRIBUTION DEVICES

[75] Inventors: Clifford M. Toraason, Cincinnati; Lawrence W. Langhorst, Hamilton, both of Ohio

[73] Assignee: General Electric Company, Cincinnati, Ohio

[21] Appl. No.: 743,057

[22] Filed: Aug. 9, 1991

[51] Int. Cl.$^5$ .............................. F17D 1/00
[52] U.S. Cl. ........................ 137/590; 184/7.4; 222/464
[58] Field of Search ............ 137/590, 395; 184/7.4, 184/65, 106, 1.5; 222/464, 564

[56] References Cited

U.S. PATENT DOCUMENTS

| | | |
|---|---|---|
| 1,086,663 | 2/1914 | Gould et al. |
| 1,398,025 | 11/1921 | James ............................. 137/590 |
| 1,523,320 | 1/1925 | Wall |
| 1,743,966 | 1/1930 | Goudard ........................ 137/590 |
| 2,210,118 | 8/1940 | Duncan ........................... 137/590 |
| 2,601,894 | 7/1952 | Morse |
| 3,326,264 | 6/1967 | Howard .......................... 137/590 |
| 3,420,413 | 1/1969 | Corsette .......................... 222/321 |
| 3,433,258 | 3/1969 | Steele ............................... 137/590 |
| 3,656,657 | 4/1972 | Smith et al. ..................... 222/464 |
| 3,779,345 | 12/1973 | Barnes et al. |
| 4,284,174 | 8/1981 | Salvana et al. ................. 184/6.4 |
| 4,290,444 | 9/1981 | Bevan ............................... 137/590 |
| 4,717,000 | 1/1988 | Waddington et al. ........ 184/6.4 |
| 4,741,155 | 5/1988 | McCarty ......................... 60/39.02 |
| 4,856,273 | 8/1989 | Murray ........................... 60/39.08 |

FOREIGN PATENT DOCUMENTS 0392025 3/1924 Fed. Rep. of Germany ...... 137/590

Primary Examiner—Ira S. Lazarus
Assistant Examiner—Alan B. Cariaso
Attorney, Agent, or Firm—Jerome C. Squillaro; John R. Rafter

[57] ABSTRACT

A flow metering device includes a standpipe mounted in a fluid reservoir such that when the level of fluid in the reservoir falls to a predetermined level, flow is metered through holes provided in the standpipe at a reduced rate of delivery.

1 Claim, 3 Drawing Sheets

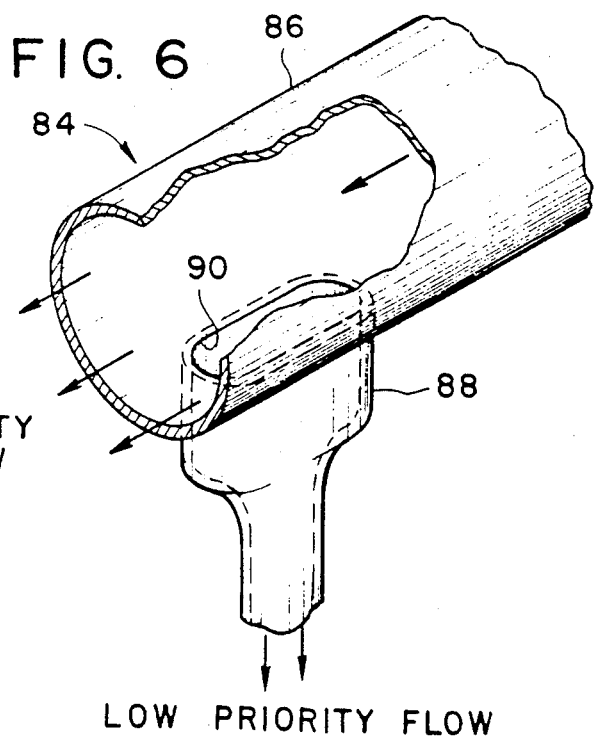
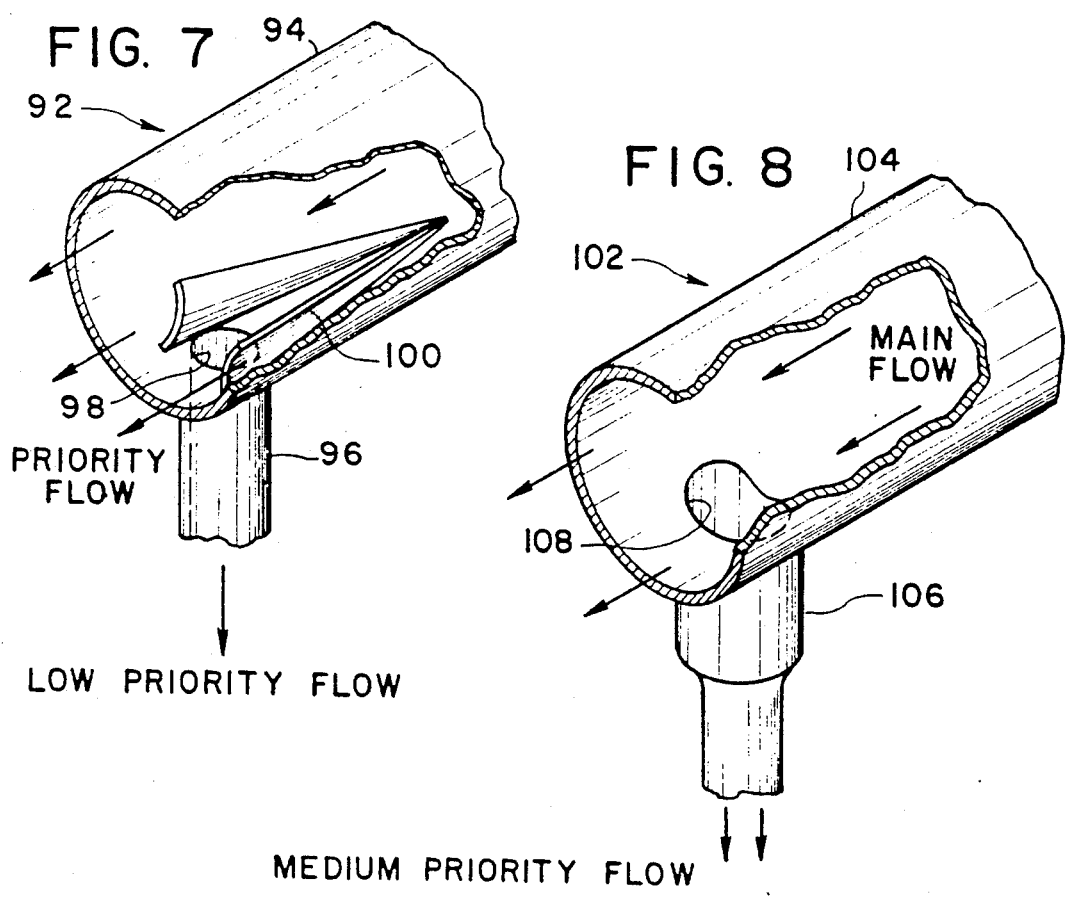

5,176,174

FLOW METERING AND DISTRIBUTION DEVICES

BACKGROUND OF THE INVENTION

1. Field of the Invention

The present invention relates generally to the field of flow control and metering, and more specifically, to flow metering and distribution devices capable of metering out and prioritizing the remaining contents of a fluid reservoir.

2. Description of the Related Art

For certain types of fluids necessary for mechanical locomotion, exhausting the supply of fluid, such as fuel, hydraulic fluid, or lubricant, can lead to adverse consequences. Conventional fluid reservoirs have an outlet in the bottom of the reservoir or have an outlet pipe or hose extending into the reservoir to terminate on or near the bottom. In either case, when the fluid level inside the reservoir reaches the outlet, the fluid delivery rate very suddenly changes from an operating flow rate to zero. As an example relative to engine lubrication, a lube line rupture, scavenge pump failure and other traumatic events can cause a jet engine to lose lubricant at a rate approaching the delivery rate of the main pump. At the normal operating flow rate, the supply of lubricant will be quickly exhausted. Operation with no lubricant, which follows, will be for only a short time before total failure of non-lubricated parts and subsequent engine failure occurs.

Similarly, in the case of a fuel reservoir approaching an exhausted supply state, the moment the fluid level falls below the reservoir outlet, or opening of an outlet pipe extending into the reservoir, the engine will cease operating suddenly. Normally, rate of fuel consumption is a function of engine load. Engine load increases as rpms increase, and also as more engine accessories are powered by the engine. By reducing speed and/or turning off engine accessories, the remaining contents of a fuel reservoir can be consumed at a lower rate. However, the operator of the engine is not normally made aware of an eminent fuel exhaustion until after it is too late. While it is not uncommon to provide warning signals when a reservoir reaches a predetermined low level, the exact timing of exhaustion is uncertain since the rate of consumption and the exact remaining quantity are unknown. Moreover, upon failure of the warning light, the operator will have no warning of the impending exhaustion of fuel, other than the fuel gauge itself, and will be unable to take active conservation measures.

SUMMARY OF THE INVENTION

An object of the present invention is to provide flow metering device which is capable of reducing the delivery rate of a fluid automatically when the fluid in a reservoir reaches a predetermined low level.

Another object of the present invention is to provide a flow metering device which is capable of delivering a quantity of fluid at a rate which diminishes as a function of time.

Another object of the present invention is to provide flow metering device which is capable of distributing fluid to areas based on established priorities.

These and other objects of the invention are met by providing flow metering device which includes a reservoir having a quantity of fluid which defines a fluid level, a standpipe disposed in the reservoir and having a sidewall, a lower end in fluid communication with a release pipe of the reservoir and an upper end spaced upwardly from the bottom wall of the reservoir, said standpipe being normally submerged in fluid, and outlet means formed in the standpipe for releasing fluid from the reservoir, said outlet means being disposed on at least two different axial positions on the standpipe.

BRIEF DESCRIPTION OF THE DRAWINGS

FIGS. 6-8 are perspective views, partially cut-away, showing variations of the embodiment of FIG. 5.

DETAILED DESCRIPTION OF THE PREFERRED EMBODIMENTS

Figure 1:
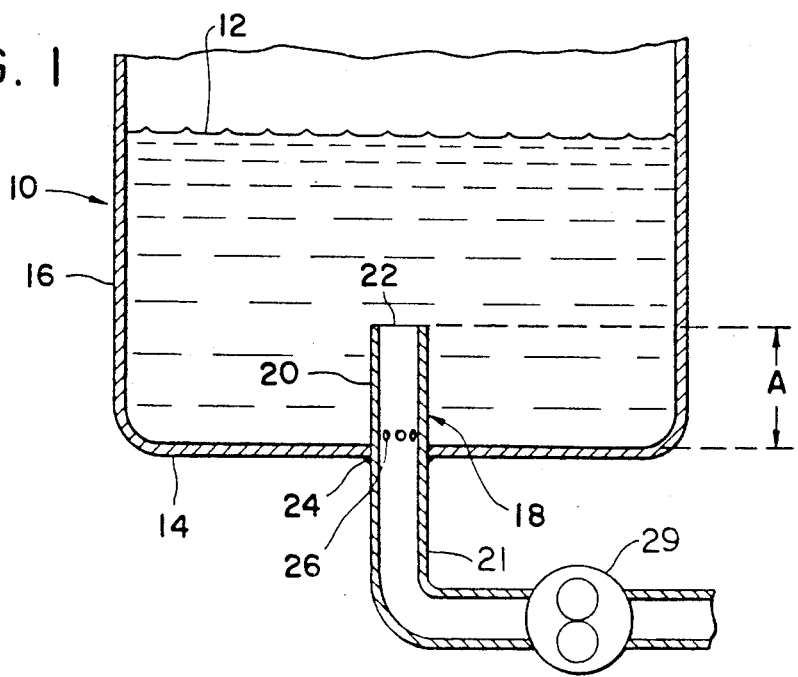
FIG. 1 is a vertical cross-sectional view of a passive flow metering device according to the present invention.

Referring to FIG. 1, a fluid reservoir 10 is illustrated by way of example, and for the purpose of the present invention may have virtually any shape so long as it functions to contain a fluid, such as lubricant, hydraulic fluid, fuel etc. The reservoir 10 is illustrated in FIG. 1 to contain a quantity of liquid which defines a fluid level 12.

The reservoir 10 has a bottom wall 14 which is integrally formed with a sidewall 16 extending around the bottom wall 14 to define an interior, fluid-containing tank which may be either pressurized (to expel fluid from within) or gravity-drained wherein a vent (not shown) would be provided. Depending on the type of tank a vacuum break (to be described below) will have a greater or lesser effect.

A standpipe 18 having a cylindrical sidewall 20 and an open upper end 22 is mounted over an opening in the bottom wall 14 and is sealingly connected thereto with any suitable means, such as an annular weld 24. Other connectors could be used, such as threaded fasteners with seals.

The standpipe 18 may be integrally formed with a drain pipe 21 which extends downwardly from the bottom wall 14 and leads to a pump 29 which draws fluid from the reservoir through the drain pipe 21. Although the illustrations herein show the standpipe 18 and drain pipe 21 to be integrally formed, a separate standpipe and drain pipe, with a suitable coupler could be employed. The height of the standpipe 18 inside the reservoir is indicated by the letter "A" as the distance from the bottom wall 14 to the open upper end 22 of the standpipe.

The standpipe 18 is provided with outlet means on at least two axial levels of the standpipe, generally at an upper level and a lower level. Once the fluid level falls below the upper level of the outlet means, the total area of the outlet means is reduced, thus providing a lower delivery rate, and a vacuum break is introduced since the upper level of the outlet means is no longer submerged in fluid. In the embodiment illustrated in FIG. 1 apertures 26 are formed circumferentially around the standpipe 18 in proximity to the bottom wall 14 of the reservoir 10, all of the apertures being centered substantially on the same horizontal plane, thus constituting the lower axial level of the outlet means. A single aperture 26 may be sufficient depending on fluid needs and on the size of the aperture. The open upper end 22 of the standpipe 18 is part of the outlet means, and is disposed at a level axially spaced upwardly from the aperture 26. Normally, the open end 22 is submerged and thus the total area of the outlet includes the area of the open end 22 and the area of the apertures 26. The area of the open end 22 is of a size sufficient to, by itself deliver maximum flow under any condition. When the fluid level falls below the height of the standpipe 18, the total area of the outlet is reduced by the area of the open end 22. The area of the lower apertures 26 is less than what would be necessary to deliver maximum flow, so that regardless of throttle positions, or pumping capacity of a fuel or oil pump, flow rate would be decreased. Moreover, the open end becomes a vacuum break which further diminishes flow rate when pump 29 connected to the drain pipe 21 is caused to ingest air.

Figure 1A:
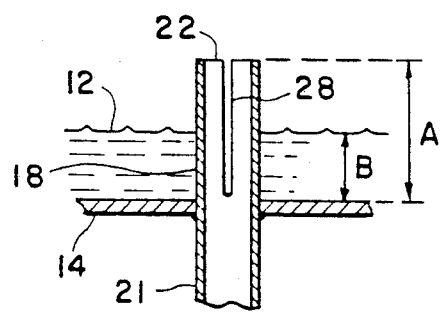
FIGS. 1(a)-1(e) are a vertical cross-sectional views showing variations of the embodiment of FIG. 1.

Variations of the embodiment illustrated in FIG. 1 are illustrated in FIGS. 1(a) through 1(e), with pump 29 not shown. In FIG. 1(a), an elongated slot 28 is formed in the sidewall 20 of the standpipe 18 and is oriented axially to extend from the open upper end 22 to a level proximity at the bottom wall 14 of the reservoir. In this embodiment, when the level of the fluid 12 falls below the height A of the standpipe 18 to a height "B" illustrated in FIG. 1(a), only the submerged portion of the slot 28 functions as an outlet, and the upper portion, which is not exposed to the liquid contained in the reservoir, acts as a vacuum break which reduces the suction of pump 29 coupled to the supply pipe 21.

Figure 1B:
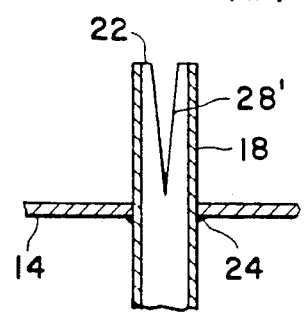

The embodiment of FIG. 1(b) illustrates a slot 28' which is tapered towards the bottom wall 14 of the reservoir. Thus, the size of the outlet diminishes at an increasing rate as the supply of liquid diminishes. This embodiment has the effect of stretching out the time within which the supply would be exhausted, and is particularly useful in cases where the reservoir contains either a lubricant or hydraulic fluid, whereby a small amount of liquid may keep a machine operating, even though the amount of liquid delivery is not enough to prevent damage to moving parts.

Figure 1C:
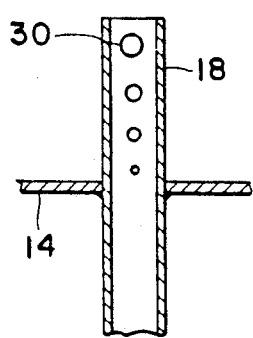
Figure 1D:
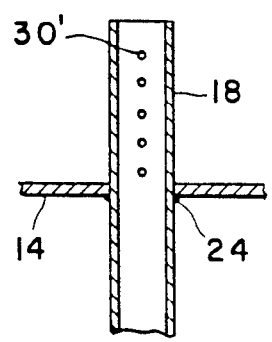
Figure 1E:
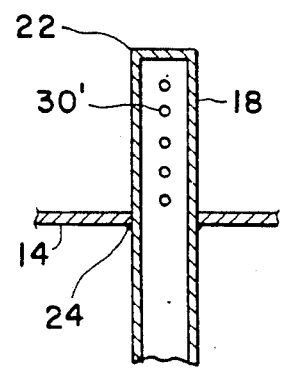

Embodiments similar in concept to the embodiments of FIGS. 1(a) and 1(b) are illustrated in FIGS. 1(c) through 1(e). In FIG. 1(c), the standpipe 18 is provided with a series of axially oriented holes 30 which have a progressively smaller diameter towards the bottom wall 14 of the reservoir. In the embodiment of FIG. 1(d), the holes 30' are all of the same diameter and are oriented axially.

In all of the embodiments of FIGS. 1 and 1(a) through 1(d), the standpipe 18 is illustrated as having an open upper end 22. In the embodiment of FIG. 1, the upper end 22 provides that part of the outlet means which becomes inoperative as an outlet, but potentially operative as a vacuum break, when the level of fluid falls below the open end 22, thus providing automatic, passive metering of the liquid contained in the reservoir. In the embodiments of FIGS. 1 and 1(a) through 1(d), the upper end 22 of the standpipe 18 could be closed, or closeable by a valve (not shown), as long as part of the outlet includes an opening of some kind in the upper portion of the standpipe, or at other positions on the standpipe spaced upwardly from the lower-most opening or openings. The slots 28 and 28' represent axially continuous openings, but nonetheless, represent outlets that are provided on at least two different axial levels of the standpipe.

If the lower level openings are of sufficient area to maintain maximum flow, the upper level opening would still become a vacuum break when uncovered.

An embodiment illustrating a closed upper end 22 of the standpipe 18 is illustrated in FIG. 1(e). In that embodiment, a series of openings 30' of the same diameter are illustrated similar to the embodiment of FIG. 1(d). It is clear, however, that one can practice the present invention by using a combination of opening-types and sizes to arrive at a desired metered flow rate. Depending on the size and location of the openings, the standpipe may provide either a two-staged metering (such as the embodiment of FIG. 1), or a variable, continuously diminishing metering rate as in the embodiments of FIGS. 1(a) and 1(e). Also, the upper end of the standpipe may be open, closed or closeable with a valve. Other openings can be closed by suitable valves and actuators, either manually or automatically upon detection of a low level or rapid loss condition.

Figure 2:
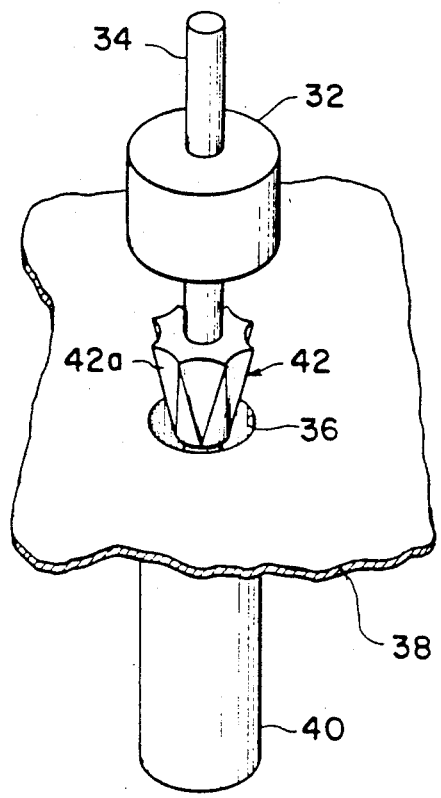
FIG. 2 is a partial perspective view of a flow metering device according to another embodiment of the present invention.

Referring now to FIG. 2, another embodiment of the present invention employs a float 32 mounted on a guide member 34, the lower end of which passes through an outlet opening 36 formed in the bottom wall 38 of a reservoir. A drain pipe 40 receives the lower end portion of the guide member 34, and the float 32 maintains the axial or vertical position of a valve element 42 relative to the opening 36, in an upward, unseated position in which the flow of fluid from the reservoir through the outlet opening 36 is essentially unrestricted.

When the fluid level falls to a point where the float can no longer hold the guide member 34 and valve element 42 upwardly, the valve element gradually seats in the opening 36 to restrict the flow of fluid therethrough. When fully seated, the upper end portion of the valve element 42 is seated in the opening 36, and a restricted flow is permitted around the circumference of the valve element 42 through fluted channels 42a. Suitable guide supports (not shown) may be provided in the reservoir and/or in the drain pipe 40 to position the valve element radially, thereby ensuring a substantially coaxial relation between the guide member 34 and the outlet opening 36.

Figure 3:
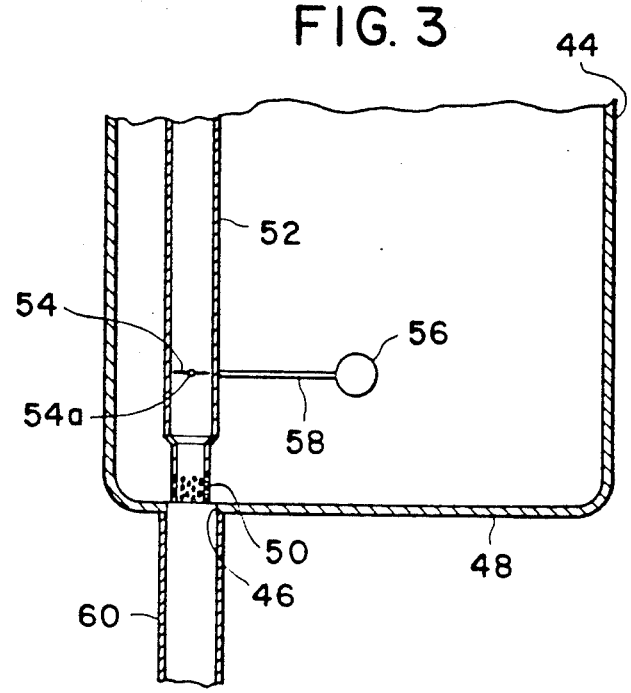
FIG. 3 is a partial perspective view of a flow metering device according to, another embodiment of the present invention.

Referring to FIG. 3, a reservoir 44 is provided with an outlet opening 46 in a bottom wall 48 thereof. An aerator 50 is disposed immediately above the outlet opening and is in fluid communication with a supply of compressed air (not shown) through a supply line 52. A valve element 54, such as a butterfly valve, is actuated by a float 56 mounted on an arm 58. The valve element is in a normally closed position, as illustrated, until a predetermined low level of fluid is reached in the reservoir, whereupon the arm 58 and float 56 rotate clockwise (in FIG. 3) to un-seat the valve element 54 by rotating about a pivot shaft 54a. When the valve is unseated, compressed air is delivered to the aerator 50 at a rate determined by the position of the float 56 so that a supply pump (not shown) connected to a supply line 60 pumps a similar volume but at a much reduced weight flow, compared to normal, due to the aeration of the fluid. This embodiment is particularly useful for more viscous liquids such as lubrication oils. While the illustrated embodiment passively introduces air into the oil, an active embodiment would employ any suitable means to couple the supply of compressed air to the aerator when a sensor or indicator warns the operator of a rapid loss or low level condition. For example, the air line 52 could be provided with an actuator controlled from the cockpit or other operator center.

Figure 4:
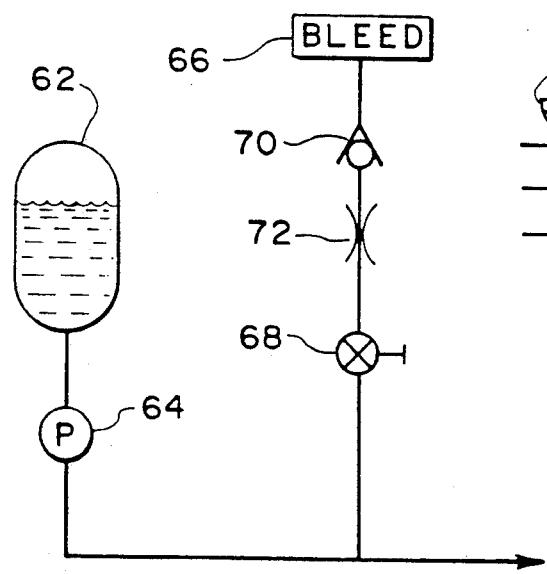
FIG. 4 is a schematic view of a flow distribution device according to another embodiment of the present invention.

Referring now to FIG. 4, a passive flow distribution system used with a reservoir 62 containing fluid, such as lubricating oil. The reservoir 62 may include any of the metering devices described above. In certain lubrication systems, particularly for aircraft jet engines, it is important to maintain pressure and flow in the distribution system to deliver the metered lubricant properly. In the normally functioning system, in which lubrication-jets direct a stream of lubricant to a specific target, the back pressure of the lube jets (meaning the pressure drop across the jets) at normal flow rates maintains the lube pressure at normal levels. This pressure is required to have the proper jet velocity and ballistic performance to deliver the lubricant to the proper areas.

According to the embodiment of FIG. 4, compressed air is introduced into the flow of oil downstream of an oil delivery pump (P) 64, so that the flow rate of oil can be reduced without adversely affecting distribution to the jets. Bleed air (BLEED) 66 from the gas turbine engine (not shown) can be used as the supply of compressed air after passing through a pressure regulating valve 68. A check valve 70 and an orifice 72 can be added to the system for system safety and to backstop the pressure regulating valve 68. A valve could be added to the line, below the pressure regulating valve 68, which could be opened either by pilot demand or automatically by a low lube level warning. Also, the pressure regulating valve can be set slightly below normal lube pressure so that air would be delivered anytime the pressure falls below this level and it would be effectively shut off at pressures above this level.

Another aspect of the present invention takes into account that different areas of a machine have different lubrication requirements. There may be as much as a 100:1 difference in requirements between various bearings in an aircraft gas turbine engine, for example. The high pressure spool main shaft bearings in heavily loaded, hot areas can be damaged if operated thirty seconds without oil. On the other hand, some accessory drive bearings and the low pressure spool bearings in cool areas can survive for an hour or more with no oil.

Since air was admitted to the lubrication system as a result of the embodiment illustrated in FIG. 4, the lines will contain air and oil, whereas they formerly ran full of oil before encountering low level rationing. Foam, as an air/oil mixture, is not likely to exist in the lines because the lines themselves are effective air/oil separators. Instead, an oil film will be created whereby the film adheres to the conduit walls and will travel more slowly than air, but is nonetheless propelled by the air stream.

Figure 5:
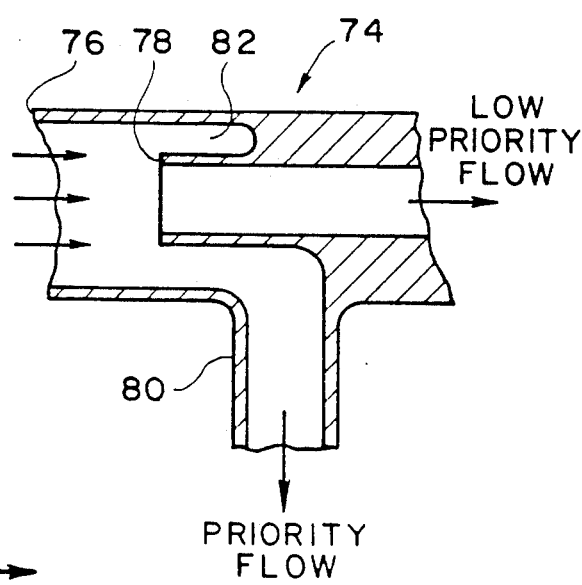
FIG. 5 is a vertical cross-sectional view of a flow distribution device according to another embodiment of the present invention.

FIGS. 5 through 8 illustrate fittings which take advantage of the aforementioned phenomenon whereby oil is travelling as a film along the inner walls of the conduit. In FIG. 5, a fitting 74 is constructed generally as a T-joint and includes a fluid inlet 76 and two fluid outlets 78 and 80. Under normal conditions, fluid flow would pass directly through both outlets 78 and 80. However, when air has been introduced into the system according the embodiment of FIG. 4 and the conduit carries a film on the interior, cylindrical surface thereof instead of being full of fluid, the film is delivered to the priority flow outlet 80 and is diverted away from the low priority flow outlet 78 due to the fact that the low priority flow outlet 78 protrudes coaxially towards the inlet 76 so as to form an annular space 82 between the low priority flow outlet 78 and the inlet 76.

In the embodiment of FIG. 6, a fitting 84 includes the first conduit 86 having a cylindrical sidewall and a second conduit 88 in communication with the first conduit 86 through an elongated opening 90. The main flow of fluids through the first conduit 86 passes the opening 90 without allowing a substantial portion of the fluid to exit through the second conduit 88. The second conduit 88 thus provides a low priority flow outlet to portions of the engine which have less vital lubrication needs, whereas the main flow is delivered to more vital engine components that require more lubrication.

In the embodiment of FIG. 7, a fitting 92 includes a first conduit 94 and a second conduit 96 in fluid communication with the first conduit 94 through an opening 98. In this embodiment, a pair of film-diverting weirs 100 are provided at an angle to each other so that the apex is upstream of the opening 98. The weirs 100 ensure that the main flow moves downstream through the first conduit 94 to areas of higher priority and essentially bypasses the low priority flow conduit 96.

In the embodiment of FIG. 8, a fitting 102 includes a first conduit 104 and a second conduit 106 in fluid communication with the first conduit 104 through an opening 108. Although the construction of the fitting 102 of the embodiment of FIG. 8 is similar to the fitting illustrated in FIG. 6, since the opening 108 traverses a more substantial portion of the conduit 104, more of the fluid film will be diverted into the second conduit 106 which acts as a medium priority flow outlet. Of course, for any of the above embodiments, the exact size and shape of the openings, and the use of dams or weirs can be selected by the technician to correspond to exact lubrication needs.

Numerous modifications and adaptations of the present invention will be apparent to those so skilled in the art and thus, it is intended by the following plans to cover all such modifications and adaptations which fall within the true spirit and scope of the invention.

What is claimed is:

1. A flow metering device comprising:
   a) a reservoir having a bottom wall and containing a quantity of fluid which defines a fluid level;
   b) a standpipe disposed in the reservoir and having a sidewall, a lower end in fluid communication with a release pipe of the reservoir and an upper end spaced upwardly from the bottom wall of the reservoir, said standpipe being normally submerged in fluid;
   c) outlet means formed on the standpipe for releasing fluid from the reservoir, said outlet means being disposed on at least two different axial positions of the standpipe;
   d) a pump having an inlet in fluid communication with said release pipe of said reservoir;
   e) vacuum breaking means for reducing a pumping capacity of said pump when the fluid level is lower than the upper end of the standpipe;
   f) wherein the upper end of the standpipe is open and the outlet means comprises a series of axially oriented holes extending from approximately the open end of the standpipe to approximately the bottom of the reservoir; and
   g) wherein the series of holes includes a plurality of holes having progressively smaller diameters towards the bottom of the reservoir.

* * * * *